US012651855B2

(12) United States Patent
Hussein et al.

(10) Patent No.: US 12,651,855 B2
(45) Date of Patent: Jun. 9, 2026

(54) CONNECTOR WITH INTEGRATED PIN PROTECTION MECHANISM

(71) Applicant: International Business Machines Corporation, Armonk, NY (US)

(72) Inventors: Abdikarim Hussein, Rochester, MN (US); Sarah K. Czaplewski-Campbell, Rochester, MN (US); Brittany McPeek, Rochester, MN (US); Megan Kasabian, Saint Paul, MN (US); Lidiya Zewdie, Minneapolis, MN (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 18/430,851

(22) Filed: Feb. 2, 2024

(65) Prior Publication Data

US 2025/0253556 A1 Aug. 7, 2025

(51) Int. Cl.

| | |
|---|---|
| ***H01R 9/28*** | (2006.01) |
| ***H01R 4/60*** | (2006.01) |
| ***H01R 24/66*** | (2011.01) |
| ***H01R 33/975*** | (2006.01) |
| ***H01R 107/00*** | (2006.01) |

(52) U.S. Cl.

CPC ................. *H01R 9/28* (2013.01); *H01R 4/60* (2013.01); *H01R 24/66* (2013.01); *H01R 33/975* (2013.01); *H01R 2107/00* (2013.01)

(58) Field of Classification Search

CPC . H01R 9/28; H01R 4/60; H01R 24/66; H01R 33/975; H01R 2107/00; H01R 24/28; H01R 13/4538

See application file for complete search history.

(56) References Cited

U.S. PATENT DOCUMENTS 4,553,322 A * 11/1985 Cappos ................ H01R 43/205 29/739
5,167,516 A * 12/1992 Tan .................... H01R 13/6485 439/140

(Continued)

FOREIGN PATENT DOCUMENTS

CN 100506305 C 7/2009
CN 217768885 U 11/2022

(Continued)

OTHER PUBLICATIONS

Floating and Non-Floating Test Socket Bases—An Introduction. https://www.testfixtures.com/floating-and-non-floating-test-socket-bases-an-introduction/ <Retrieved Jan. 8, 2024>.

*Primary Examiner* — Edwin A. Leon
(74) *Attorney, Agent, or Firm* — Kimberly Zillig

(57) ABSTRACT

A connector structure that includes a housing, at least one pin located within the housing, and a moveable protection plate located within the housing, and moveably connected to the housing. The moveable protection plate includes at least one opening through which the at least one pin extends therethrough. The moveable protection plate is configured to protect the at least one pin before the connector structure is connected with a receptacle, and the moveable protection plate is configured to be moved within the housing to allow the at least one pin to be exposed when the connector structure is mated with the receptacle.

20 Claims, 9 Drawing Sheets

(56) References Cited

U.S. PATENT DOCUMENTS

| | | | | | |
|---|---|---|---|---|---|
| 5,466,164 | A * | 11/1995 | Miyazaki | H01R 13/5213 439/140 |
| 5,518,410 | A * | 5/1996 | Masami | H01R 13/2485 439/700 |
| 5,779,491 | A * | 7/1998 | Nagano | H01R 13/629 439/141 |
| 5,961,337 | A * | 10/1999 | Kordes | H01R 13/4538 439/141 |
| 6,908,038 | B1 | 6/2005 | Le | |
| 11,114,795 | B2 | 9/2021 | Miyamura | |
| 2018/0301830 | A1 * | 10/2018 | Hoyack | H01R 12/73 |
| 2022/0029353 | A1 | 1/2022 | Moll | |
| 2022/0200201 | A1 | 6/2022 | Fox | |
| 2022/0294150 | A1 | 9/2022 | Rodriguez | |

FOREIGN PATENT DOCUMENTS

| | | | |
|---|---|---|---|
| TW | 593203 | B | 7/2017 |
| WO | 2017091591 | A1 | 6/2017 |

* cited by examiner

CONNECTOR WITH INTEGRATED PIN PROTECTION MECHANISM

BACKGROUND

The present invention generally relates to connectors, and more particularly to a connector for providing electrical connection or communication functionality between electronic devices.

Connectors are widely used in the electronics industry. The function of the connectors can be to mate a single pin or an array of pins to a socket or receptacle to transfer power or signal between two circuits.

SUMMARY

According to some embodiments of the disclosure, there is provided a connector structure. The connector structure can include a housing, at least one pin located within the housing, and a moveable protection plate located within the housing, and moveably connected to the housing. The moveable protection plate can include at least one opening through which the at least one pin extends therethrough. The moveable protection plate can be configured to protect the at least one pin before the connector structure is connected with a receptacle, and the moveable protection plate can be configured to be moved within the housing to allow the at least one pin to be exposed when the connector structure is mated with the receptacle.

According to some embodiments of the disclosure, there is provided a connector structure. The connector structure can include a housing, at least one pin located within the housing, a moveable protection plate located within the housing, and moveably connected to the housing, and at least one spring located within the housing and under the moveable protection plate. The moveable protection plate can include at least one opening through which each of the at least one pin extends therethrough. The moveable protection plate can be configured to protect the at least one pin before the connector structure is connected with a receptacle, the at least one spring can be configured to bias the moveable protection plate to a position to protection the at least one pin, and the moveable protection plate can be configured to be moved within the housing to allow the at least one pin to be exposed when the connector structure is mated with the receptacle.

According to some embodiments of the disclosure, there is provided a method. The method includes an operation of providing a connector structure comprising: a housing, at least one pin located within the housing, and a moveable protection plate located within the housing in a raised position, and moveably connected to the housing, and including at least one opening through which the at least one pin extends therethrough. The method also includes an operation of connecting the connector structure with a receptacle, wherein the moveable protection plate is configured to be moved within the housing to a lowered position to allow the at least one pin to be exposed when the connector structure is connected with the receptacle.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
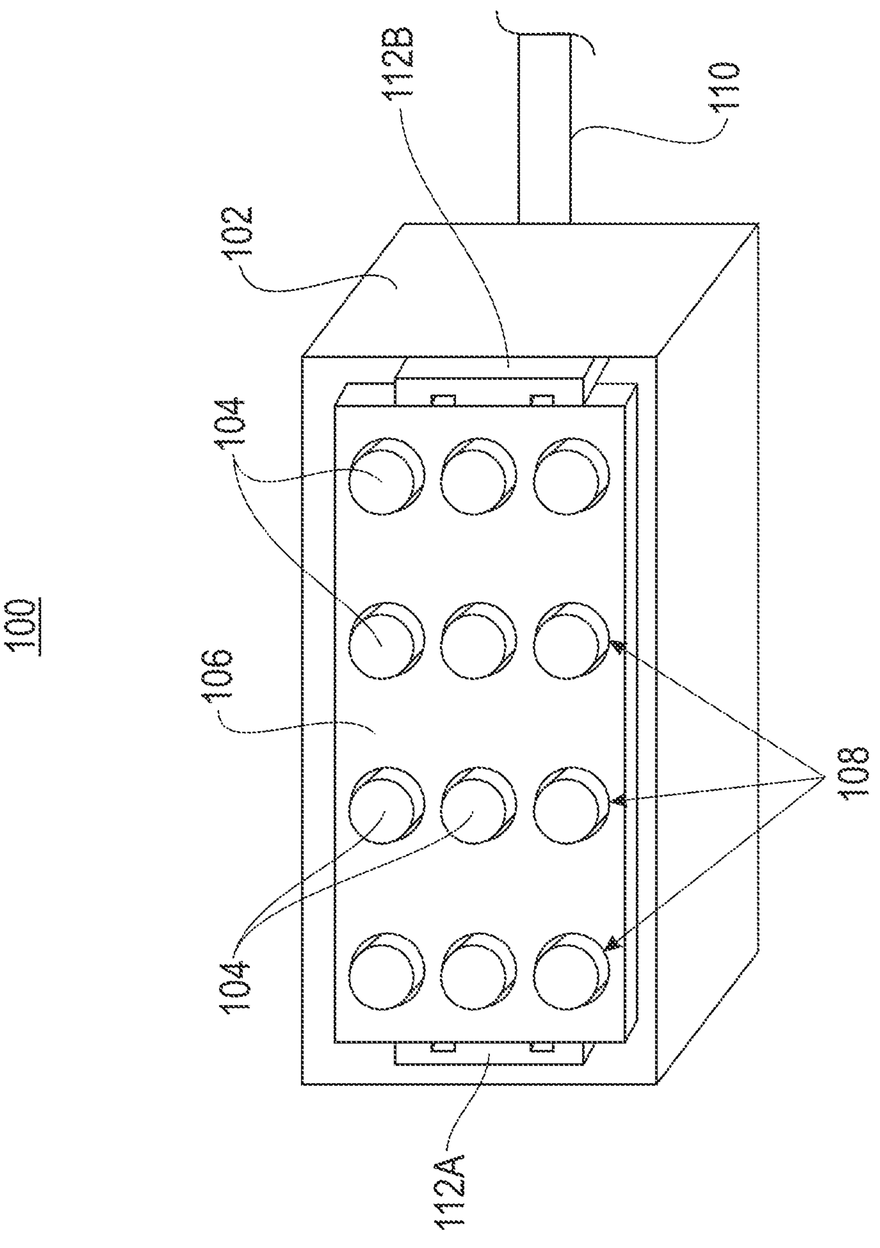
FIG. 1A illustrates a perspective view of a connector in an extended configuration, in accordance with an embodiment of the invention.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate generally to connector for providing electrical connection or communication functionality between electronic devices. More particularly, the present disclosure provides a connector structure with an integrated movable pin protection mechanism. The present disclosure also provides a process for plugging and unplugging the connector structure to minimize risk of damage to connector pins. While the present disclosure is not necessarily limited to such applications, various aspects of the disclosure can be appreciated through a discussion of various examples using this context.

Connectors involve a physical connection being made with mating hardware and can, therefore, be vulnerable to types of failure. For example, one common connector failure mechanism involves bent pins. Bent pins can cause defects such as short circuits, burns, opens due to poor connection, and damage to mating hardware, for example. Bent pins can also increase costs and manufacturing downtime. For example, hardware damaged by bent pins can be scrapped and result in replacement costs. Bent pins can also involve rework costs and inspection costs.

Embodiments of the present disclosure can include a connector including a moveable pin protection mechanism integrated into a housing of the connector. The moveable pin protection mechanism can include a retractable plate with multiple orifices that allow the retractable plate to surround and move along pins of the connector when the retractable plate is moved from an extended configuration to a retracted configuration. Embodiments of the present disclosure can include a process for plugging and unplugging a connector into and out of a receptacle to minimize risk of damage to connector pins.

Embodiments of the present disclosure include a connector including a retractable, or moveable, protection plate that can be integrated into a housing of the connector to protect pins of the connector from bending during shipping, handling, and connector insertion/removal and/or minimize risk of damage to individual pins in an array of pins of the connector during shipping, handling, and connector insertion/removal.

Embodiments of the present disclosure can include different connector designs that include a housing or enclosure surrounding a single vertical pin or an array of vertical pins. The pins in an array of pins can include any number of pins and any number of rows of pins in different configurations. The connectors of the present disclosure are not limited to those connectors on cables and connectors attached to printed circuit boards (PCBs) (either press fit into plated-through-holes (PTHs) or soldered).

Embodiments of the present disclosure can provide advantages that can be valuable to the electronics industry and purchasers and users of electronics, for example. Embodiments can result in a reduction in a frequency of bent or damaged pins in connectors. Embodiments of the present disclosure can result in preventing damage to pins of a connector during shipping and/or packaging of the connector. Embodiments of the present disclosure can result in preventing damage to pins of a connector when the connector is connected and disconnected (e.g., plugged and unplugged) to a same, or different, receptacle multiple times. Embodiments of the present disclosure can serve to protect an array of pins within a connector when it is not connected to a receptacle.

It is to be understood that the present disclosure will be described in terms of a given illustrative architecture; however, other architectures, structures, and process features and steps/blocks can be varied within the scope of the present disclosure. It should be noted that certain features cannot be shown in all figures for the sake of clarity. This is not intended to be interpreted as a limitation of any particular embodiment, or illustration, or scope of the claims.

FIG. 1A illustrates a perspective view of a connector structure 100 in an extended configuration, in accordance with an embodiment of the invention. The connector structure 100 including a housing 102 that, includes five (5) sides that surround a plurality or array of pins 104 and a moveable or retractable protection plate 106 located in a fully extended, or raised, position. The protection plate 106 is capable of pin protection. The protection plate 106 that includes a plurality of circular openings 108 that each surround one of the array of pins 104 and allow the array of pins 104 to move therethrough when the protection plate 106 is moved to a retracted position (as shown in the FIGS. 2A-2B discussed below). The plurality of circular openings 108 can be circular, as shown, or can be any other suitable shape that can coordinate with any suitable cross-sectional shape of the pins 104 (which is shown as circular in the figures). The protection plate 106 is shown in the fully extended position and serves to protect the array of pins 104 from damage while the connector structure 100 is disconnected from a receptacle (not shown). A cord 110 is also shown attached to and through the housing 102 that can include a wire or wires (not shown) that are attached to and that can provide power or signals to the array of pins 104.

Figure 1B:
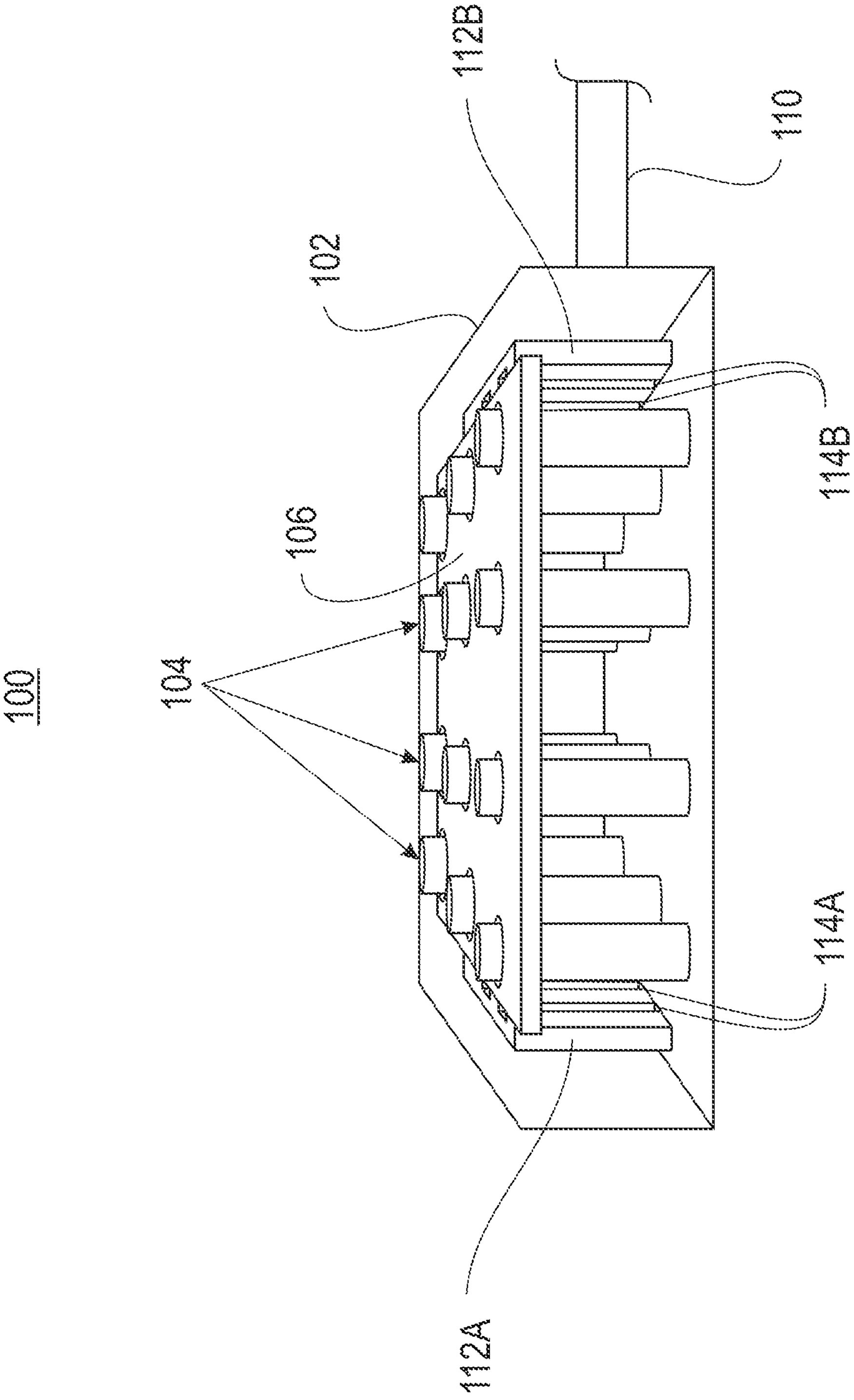
FIG. 1B illustrates a cut-away, sideview of the connector of FIG. 1A, in accordance with an embodiment of the invention.

FIG. 1B illustrates a cut-away, sideview of the connector structure 100 of FIG. 1A, in accordance with an embodiment of the invention. The view of the connector structure 100 shows the protection plate 106, in the extended configuration, can be located near (and surround) upper, free ends of the array of pins 104. On two opposite sides of the protection plate 106, a first guide 112A and a second guide 112B are shown attached to the housing 102. The protection plate 106 includes portions (not visible in figure but discussed in detail below with regard to FIGS. 3A-3C) that can be moved along a first set of tracks 114A within the first guide 112A and a second set of tracks 114B within the second guide 112B. The first guide 112A and the second guide 112B allow the protection plate 106 to be moved between the extended configuration, shown in FIGS. 1A-1B, and a retracted configuration shown in FIGS. 2A-2B (discussed below) along the first set of tracks 114A and the second set of tracks 114B. The protection plate 106 can be guided by the first set of tracks 114A and the second set of tracks 114B in the first guide 112A and the second guide 112B, respectively, that are located on sides of the housing 102. Alternatively, a first and second set of tracks can be located on an inner surface of the housing 102 or in the first and second guides 112A, 112B.

Figure 2A:
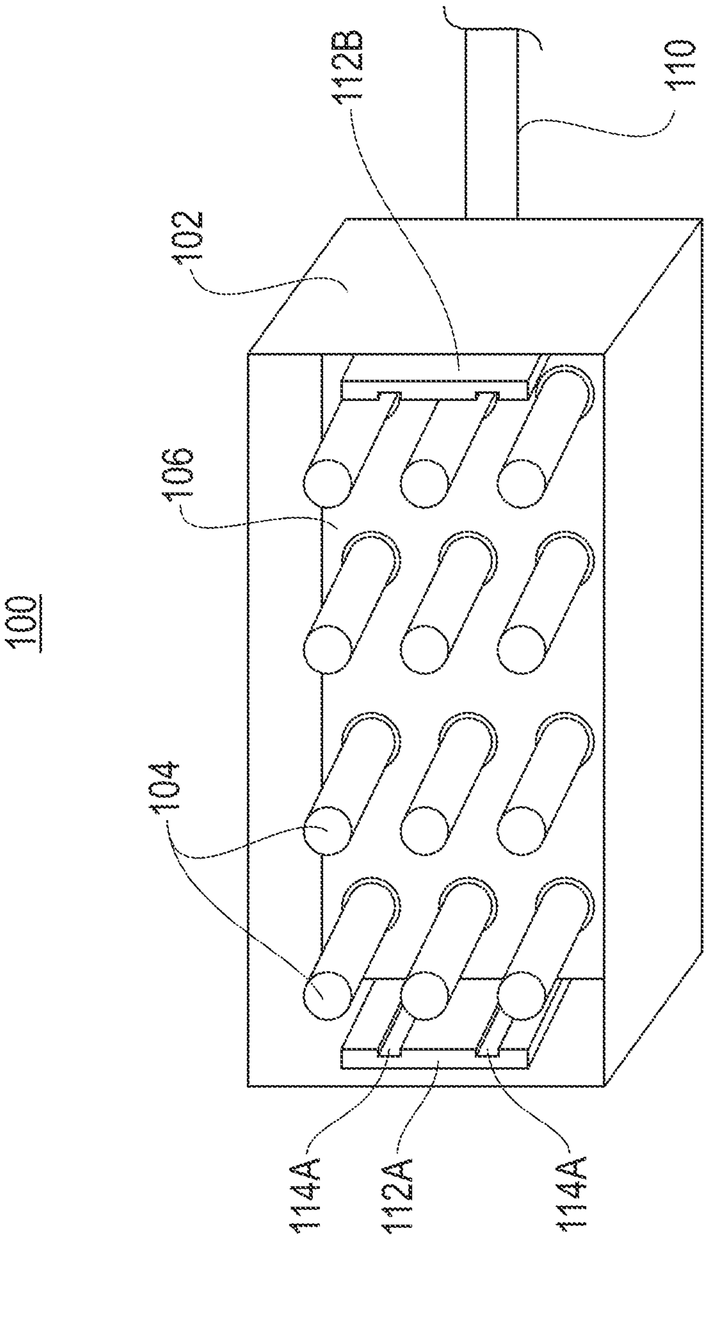
FIG. 2A illustrates a perspective view of the connector of FIG. 1A in a retracted configuration, in accordance with an embodiment of the invention.
Figure 2B:
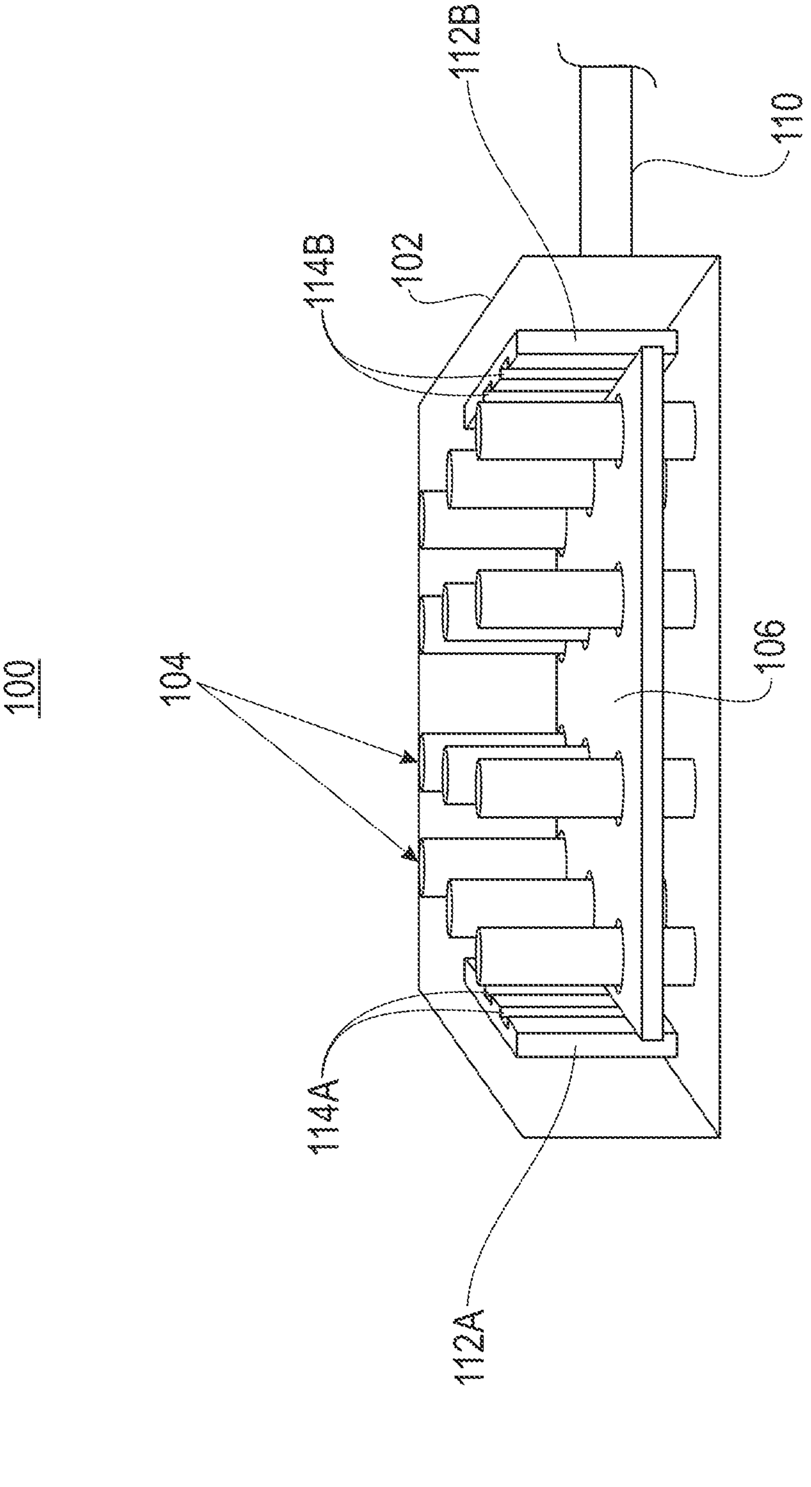
FIG. 2B illustrates a cut-away, sideview of the connector of FIG. 2A, in accordance with an embodiment of the invention.

FIG. 2A illustrates a perspective view of the connector structure 100 of FIG. 1A in a retracted configuration, in accordance with an embodiment of the invention. FIG. 2B illustrates a cut-away, sideview of the connector structure 100 of FIG. 2A, in accordance with an embodiment of the invention. The figures show the protection plate 106 in a fully retracted, or lowered, position and is located near a base of the array of pins 104 near where the array of pins 104 are attached to the housing 102. The first guide 112A and the second guide 112B are visible including the first set of tracks 114A and the second set of tracks 114B that extend perpendicular to the protection plate 106. The protection plate 106 is shown in the retracted position after being depressed or lowered by a receptacle or mating hardware (not shown), for example, when the connector structure 100 was inserted or plugged into the receptacle or mating hardware. The protection plate 106 is shown slidably coupled to the housing 102 using the first guide 112A and the second guide 112B, where the first set of tracks 114A and the second set of tracks 114B can guide the protection plate 106 to the retracted position. When the connector structure 100 is detached from the receptacle or mating hardware, in some embodiments, the protection plate 106 can freely move back and return to the extended, or raised, position.

FIG. 2A illustrates a perspective view of the connector structure 100 of FIG. 1A in a retracted configuration, in accordance with an embodiment of the invention. FIG. 2B illustrates a cut-away, sideview of the connector structure 100 of FIG. 2A, in accordance with an embodiment of the invention. The figures show the protection plate 106 in a fully retracted, or lowered, position and is located near a base of the array of pins 104 near where the array of pins 104 are attached to the housing 102. The first guide 112A and the second guide 112B are visible including the first tracks 114A and the second tracks 114B that extend perpendicular to the protection plate 106. The protection plate 106 is shown in the retracted position after being depressed or lowered by a receptacle or mating hardware (not shown), for example, when the connector structure 100 was inserted or plugged into the receptacle or mating hardware. The protection plate 106 is shown slidably coupled to the housing 102 using the first guide 112A and the second guide 112B, where the first tracks 114A and the second tracks 114B can guide the protection plate 106 to the retracted position. When the connector structure 100 is detached from the receptacle or mating hardware, in some embodiments, the protection plate 106 can freely move back and return to the extended, or raised, position.

The protection plate 106, and any retractable plate that can be used in any of the embodiments described herein, can be made of a standard, non-conductive polymeric material, for example, such as those materials used in the manufacture of connector housings. Some examples of materials that can be used for the protection plate 106 (and any other protection plates described herein) include, but are not limited to, liquid crystal polymers (LCPs) and a blend of polycarbonate (PC) and acrylonitrile butadiene styrene (ABS), otherwise known as PC/ABS.

Figure 3A:
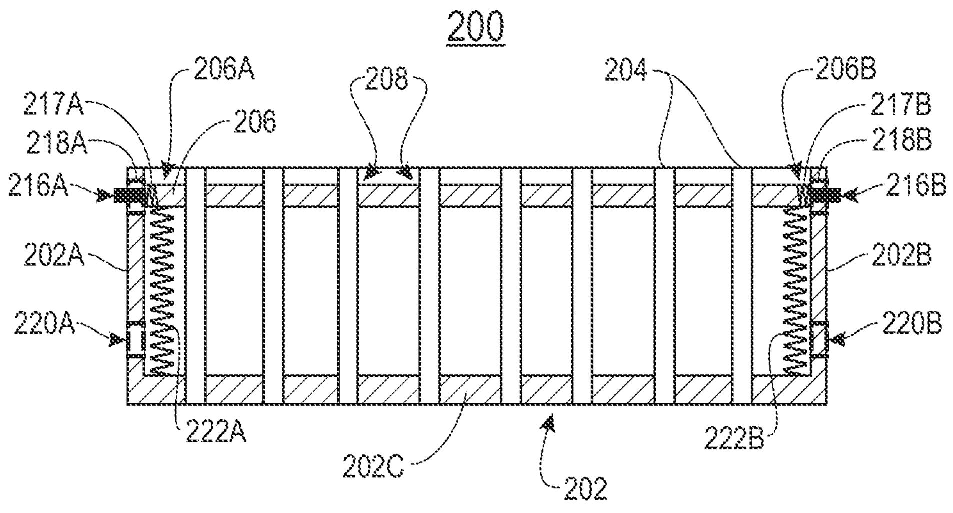
FIG. 3A illustrates a cross-sectional view of a connector in an extended configuration, in accordance with an embodiment of the invention.
Figure 3B:
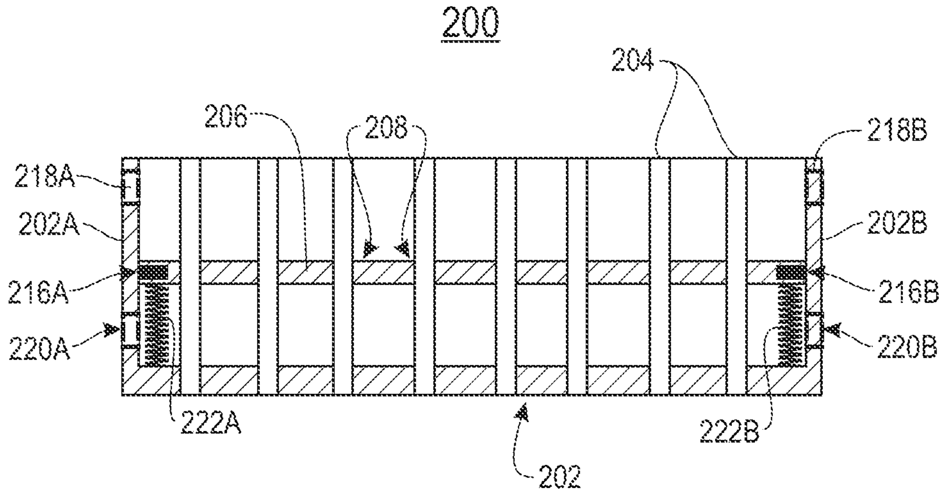
FIG. 3B illustrates the cross-sectional view of the connector of FIG. 3A in a partially retracted configuration, in accordance with an embodiment of the invention.
Figure 3C:
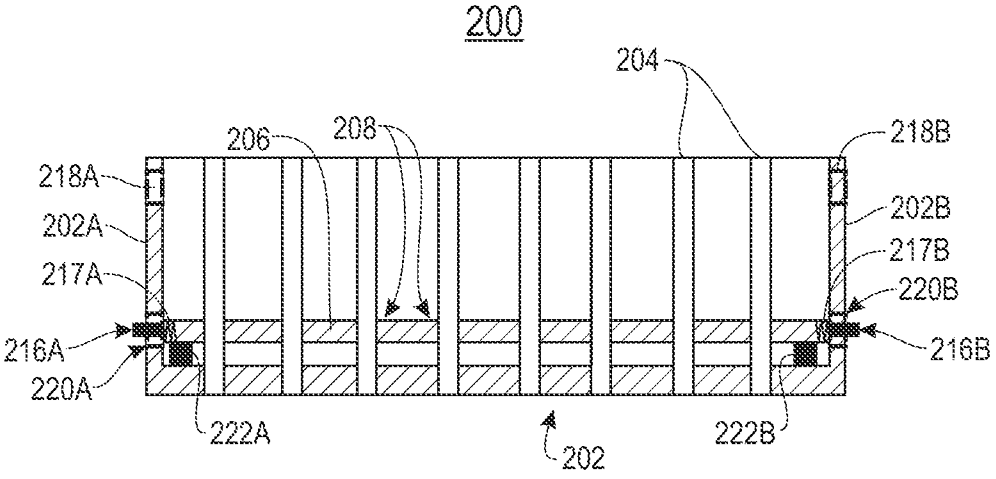
FIG. 3C illustrates the cross-sectional view of the connector of FIG. 3A in a fully retracted configuration, in accordance with an embodiment of the invention.

FIG. 3A illustrates a cross-sectional view of a connector structure 200 in an extended configuration, FIG. 3B illustrates the cross-sectional view of the connector structure 200 of FIG. 3A in a partially retracted, or lowered, configuration, and FIG. 3C illustrates the cross-sectional view of the connector structure 200 of FIG. 3A in a fully retracted configuration, in accordance with an embodiment of the invention. The embodiment shown in FIG. 3A-3C is one example of a connector structure with an integrated movable pin protection mechanism.

FIG. 3A shows the connector structure 200 includes a housing 202 (including five (5) sides) that surrounds an array of pins 204, with the array of pins 204 being attached to a bottom side 202C of the housing 202, The array of pins 204 can provide power or signals to an attached receptacle (not shown). A moveable or retractable protection plate 206, includes a plurality of openings 208 through which the array of pins 204 moves therethrough when the protection plate 206 is moved within the housing 202. The protection plate 206 is capable of pin protection and is shown that includes a first retractable protrusion 216A on a first side 206A of the protection plate 206 and a second retractable protrusion 216B on a second side 206B of the protection plate 206. As shown, the first retractable protrusion 216A and the second retractable protrusion 216B can extend into, respectively, a first, upper opening 218A in a first side 202A of the housing 202 and a second, upper opening 218B in a second side 202B of the housing 202 and are biased to the extended position by a first protrusion spring 217A and a second protrusion spring 217B, respectively. The first retractable protrusion 216A and the second retractable protrusion 216B combined with the first, upper opening 218A and the second, upper opening 218B are an example of one mechanism that can be used to hold or lock the protection plate 206 in an extended configuration or raised position, which can prevent accidental lowering or retracting of the protection plate 206 during shipping, for example. As shown, the connector structure 200 includes two (2) springs, a first plate spring 222A and a second plate spring 222B located under the protection plate 206. The first plate spring 222A and the second plate spring 222B can be used, for example, to apply force upward onto the protection plate 206, and can provide a counter force to force applied to the protection plate 206 to move the retractable plate to a lowered position or retracted position. The first plate spring 222A and the second plate spring 222B can assist in lowering/raising the protection plate 206. The protection plate 206 can be pushed down by a mating receptacle (not shown) during plugging. In order to lower the protection plate 206, the first retractable protrusion 216A and the second retractable protrusion 216B can be pressed inward from outside the housing 202 by a user, for example. The protection plate 206 can be configured to slide within the housing 202 against a spring bias in response to displacement of the protection plate 206 by a mating receptacle being connected with the connector structure 200. The protection plate 206 can be unlocked from the lowered position and returned to the raised position when the connector structure 200 is unmated from a receptacle.

FIG. 3B shows the protection plate 206 being partially retracted, or lowered, in the housing 202. The partially retracted configuration shown can result from the connector structure 200 being partially mated into a mating receptacle. The first retractable protrusion 216A and the second retractable protrusion 216B are shown retracted or pushed back into the protection plate 206 while still being in contact with the first side 202A and the second side 202B, respectively, of the housing 202. The first protrusion spring 217A and the second protrusion spring 217B are compressed inside the first retractable protrusion 216A and the second retractable protrusion 216B, respectively, and may not be visible, as shown. The first plate spring 222A and the second plate spring 222B are shown as partially compressed against a bottom side of the protection plate 206.

FIG. 3C shows the protection plate 206 in a fully retracted configuration, as it can appear when the connector structure 200 is mated with a receptacle (not shown). The first plate spring 222A and the second plate spring 222B are compressed. The first protrusion spring 217A and the second protrusion spring 217B are extended (less compressed) and the first retractable protrusion 216 and the second retractable protrusion 216B extend into, respectively, a first, lower opening 220A in the first side 202A of the housing 202 and a second, lower opening 220B in the second side 202B of the housing 202. The embodiment of FIG. 3C includes one mechanism to hold or maintain the protection plate 206 in a lowered position once the connector structure 200 is mated with a receptacle (not shown) and is included to reduce resistive force on the connector structure 200. The mechanism shown can be disengaged prior to unplugging the connector structure 200 to release the protection plate 206 and allow the protection plate 206 to raise up during unplugging the connector structure 200 for the receptacle (not shown).

In the embodiment of FIGS. 3A-3C, the first retractable protrusion 216A and the second retractable protrusion 216B, including the first protrusion spring 217 and the second protrusion spring 217B, are one example of a mechanism that can be used together to controllably move the protection plate 206 from a raised position to a lowered position and vice versa. The mechanism can either allow for or prevent movement of the protection plate 206 within the housing 202 between the upper openings 218A, 218B and the lower openings 220A, 220B. Other suitable mechanisms can be used to control movement of the protection plate 206 between the upper openings 208A, 208B and the lower openings 220A, 220B. For example, another mechanism can be to use a telescoping protrusion in place of the retractable protrusion of FIGS. 3A-3C. The telescoping protrusion (not shown) can include a first telescoping portion located inside, and that is moveable with respect to, a second portion of the telescoping protrusion. The movement of the first telescoping portion can be controlled by a user of the connector structure 200 from outside the housing 202, for example, and can allow the protection plate 206 to be moved (raised and lowered) within the housing 202 and around the array of pins 204 between the upper openings 218A, 218B and the lower openings 220A, 220B. Any suitable mechanisms that can be used to move and/or maintain the protection plate 206 within the housing can be reversible, to allow the protection plate to surround the array of pins 204 each time the connector structure 200 is unplugged from a receptacle. Alternatively, any suitable such mechanism may only be capable of functioning one time, such that once the protection plate 206 is lowered in the connector structure 200, the protection cannot be raised again when the connector structure 200 is unplugged from a receptacle.

Figure 4A:
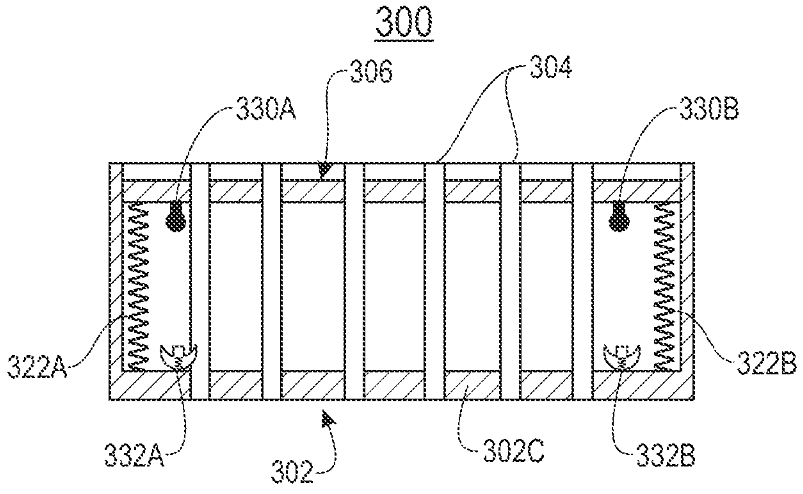
FIG. 4A illustrates a cross-sectional view of a connector in an extended configuration, in accordance with an embodiment of the invention.
Figure 4B:
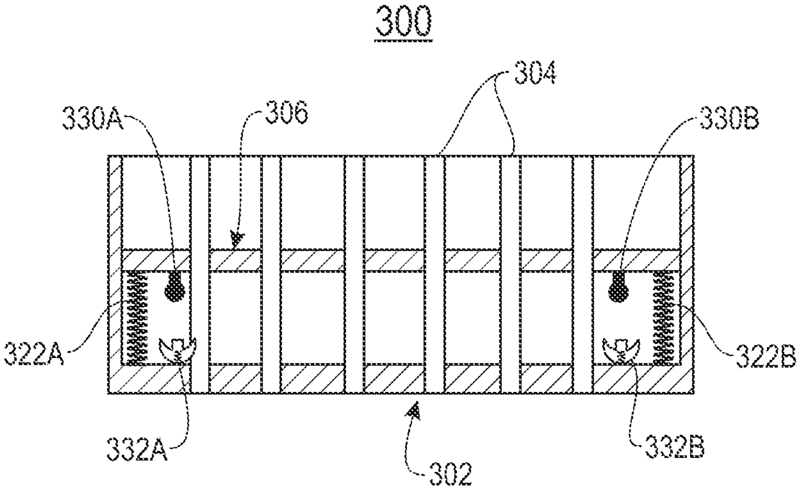
FIG. 4B illustrates the cross-sectional view of the connector of FIG. 4A in a partially retracted configuration, in accordance with an embodiment of the invention.
Figure 4C:
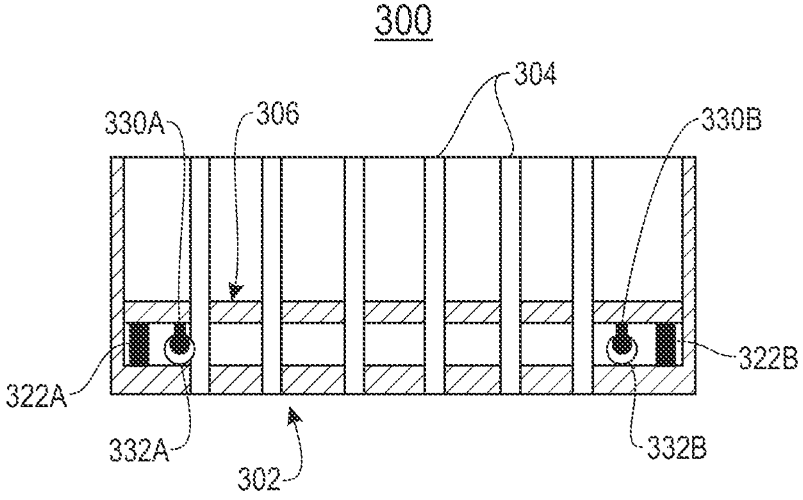
FIG. 4C illustrates the cross-sectional view of the connector of FIG. 3B in a fully retracted configuration, in accordance with an embodiment of the invention.

FIG. 4A illustrates a cross-sectional view of a connector structure 300 in an extended configuration, FIG. 4B illustrates the cross-sectional view of the connector structure 300 of FIG. 4A in a partially retracted configuration, and FIG. 4C illustrates the cross-sectional view of the connector structure 300 of FIG. 3B in a fully retracted configuration, in accordance with an embodiment of the invention.

FIG. 4A shows the connector structure 300 includes a housing 302 (including five (5) sides) that surrounds or encloses an array of pins 304, with the array of pins 304 being attached to a bottom side 302C of the housing 302, The array of pins 304 can provide power or signals to an attached receptacle (not shown). A moveable or retractable protection plate 306, that is capable of pin protection, is shown in a raised position. A first plate spring 322A and a second plate spring 322B are located under the protection plate 306 and can hold or bias the protection plate 306 in the raised position, as shown. A latching mechanism, or mechanism capable of retaining, the protection plate 306, is shown "unlatched" in the figure. One such latching mechanism is shown and includes a first ball 330A and a second ball 330B located below the protection plate 306, and a first mating portion 332A and a second mating portion 332B on the bottom side 302C of the housing 302. The first mating portion 332A and the second mating portion 332B can, for example, be capable of mechanically gripping or otherwise holding the first ball 330A and the second ball 330B, respectively. Other suitable latching mechanisms are contemplated by the present disclosure. For example, the shape of the first ball 330A and the second ball 330B can, alternatively, be any suitable shape of protrusion on the bottom of the protection plate 306 that can be captured by a mating portion or receptacle on the bottom side 302C the housing 302 to hold the protection plate 306 in place. The mating portions 332A, 332B can, for example, include arms that close around the first and the second balls 330A, 330B, or other-shaped protrusions. The suitable latching mechanism of the present disclosure can either reversibly couple the two portions of the latching mechanism or not. A suitable latching mechanism can, for example, be released if the protection plate 306 is pressed downward to release the first ball 330A and the second ball 330B, for example, from the first mating portion 332A and the second mating portion 332B, respectively. Alternatively, the first ball 330A and the second ball 330B can, for example, be magnetically charged and the first mating portion 332A and the second mating portion 332B can be magnetically charged to be magnetically coupled to the first ball 330A and the second ball 330B, respectively.

Another example of a latching mechanism that can be used to retain the protection plate 306 in the lowered position is a non-magnetic push mechanism to release latches, such as those used on cabinet doors. Any other suitable latching mechanism, whether reversibly able to be latched and unlatched or not, are also contemplated by the present disclosure.

FIG. 4B shows the protection plate 306 being partially retracted, or lowered, in the housing 302. The partially retracted configuration shown can result from the connector structure 300 being partially mated into a mating receptacle.

FIG. 4C shows the protection plate 306 in a fully retracted configuration, as it can appear when the connector structure 300 is mated with a receptacle (not shown). The first plate spring 322A and the second plate spring 322B are compressed. The first ball 330A and the second ball 330B are coupled with the first mating portion 332A and the second mating portion 332B, respectively. The exemplary latching mechanism shown holds the protection plate 306 in the lowered position, even after a mating receptacle is removed from within the housing 302 of the connector structure 300. The protection plate 306 in the embodiment shown only locks the protection plate 306 in place in the lowered position, as in FIG. 4C.

Figure 5:
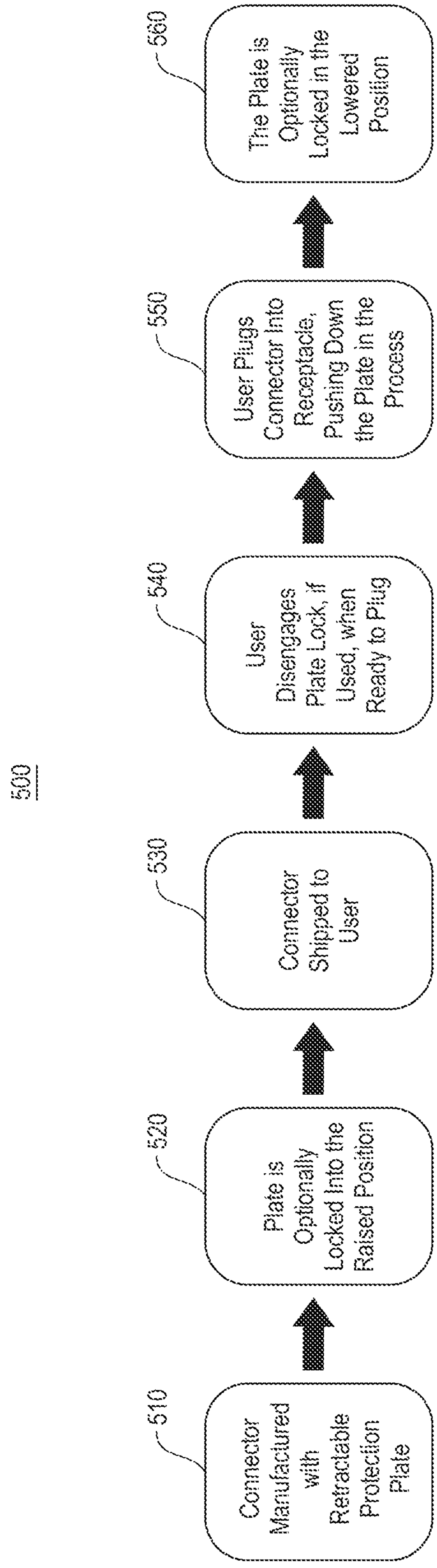
FIG. 5 illustrates a flow chart of example operations of a method for shipping and plugging a connector, in accordance with an embodiment of the invention, in accordance with an embodiment of the invention.

FIG. 5 illustrates a flow chart of example operations of a method 500 for shipping and plugging a connector, e.g., the connector structure 200 of FIGS. 3A-3C, which includes a moveable or retractable protection plate 206, in accordance with an embodiment of the invention. The method 500 includes an operation 510 of the connector structure 200 being manufactured with the retractable protection plate 206. As in operation 520, the retractable protection plate 206 can be optionally locked into a raised position, such as in FIG. 3A. As in operation 530, the connector structure 200 can be shipped to a user. As in operation 540, the user can disengage a plate lock (e.g., the lock includes the first and second retractable protrusions 216A, 216B being located in the first and second upper openings 218A, 218B). As in operation 550, the user can plug or insert the connector structure 200 into a receptacle (not shown), which results in the retractable protection plate 206 being pushed down. As in operation 560, the retractable protection plate 206 is optionally locked in the lowered position, as in FIG. 3C (the lock can include e.g., the first and second retractable protrusions 216A, 216B being located in the first and second lower openings 220A, 220B).

Figure 6:
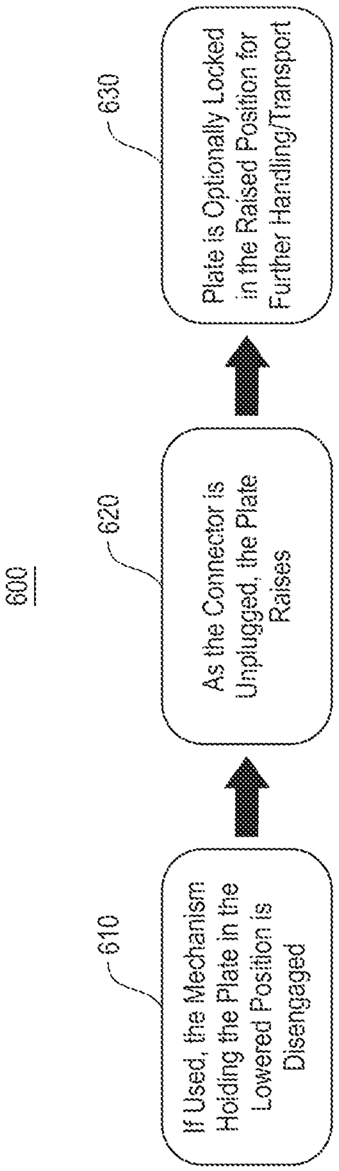
FIG. 6 illustrates a flow chart of example operations of a method for unplugging and storing a connector, in accordance with an embodiment of the invention.

FIG. 6 illustrates a flow chart of example operations of a method 600 for unplugging and storing a connector, e.g., the connector structure 200 of FIGS. 3A-3C with a moveable or retractable protection plate 206, in accordance with an embodiment of the invention. The method 600 includes an operation 610 of disengaging a mechanism that can be used to hold or lock the protection plate 206 in a lowered position (the lowered position can include, e.g., the first and second retractable protrusions 216A, 216B being located in the first and second lower openings 220A, 220B). As in operation 620, the connector structure 200 can be unplugged from a receptacle, and the protection plate 206 can raise to a raised portion, and in operation 630 can be optionally locked in the raised position for further handling or transport (e.g., the raised and locked position can include, e.g., the first and second retractable protrusions 216A, 216B being located in the first and second upper openings 218A, 218B).

Figure 7:
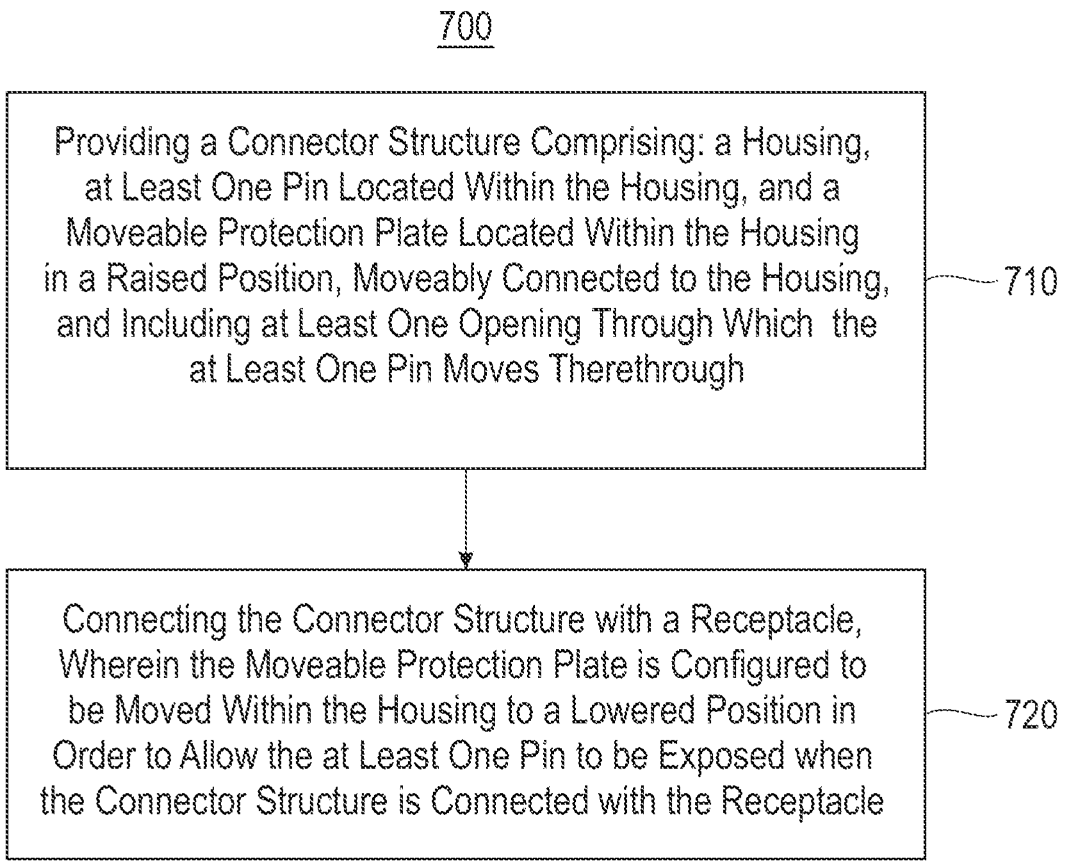
FIG. 7 illustrates a flow chart of example operations of a method, in accordance with an embodiment of the invention.

FIG. 7 illustrates a flow chart of example operations of a method 700, in accordance with an embodiment of the invention. The method 700 includes an operation 710 of providing a connector structure, for example, the connector structure 200 in FIGS. 3A-3C, comprising: a housing 202, at least one pin (of the array of pins 204) located within the housing 202, and a moveable protection plate 206 located within the housing 202 in a raised position (as shown in FIG. 3A), and moveably connected to the housing 202, and including at least one opening 208 through which each of the at least one pin (of the array of pins 204) extends therethrough. The method 700 also includes an operation 720 of connecting the connector structure 200 with a receptacle, wherein the moveable protection plate 206 is configured to be moved within the housing 202 to a lowered position (as shown in FIG. 3C) to allow the at least one pin (of the array of pins 204) to be exposed when the connector structure 200 is connected with the receptacle. The method 700 can also include an operation of, after connecting the connector structure 200 with the receptacle, disconnecting the connector structure 200 from the receptacle and returning the moveable-protection plate 206 to the raised position (as shown in FIG. 3A). The method 700 can also include an operation of locking the moveable protection plate 206 in the raised position (as shown in FIG. 3A). The method 700 can also include an operation of locking the moveable protection plate in the lowered position (as shown in FIG. 3C). The method 700 can also include an operation of, prior to connecting the connector structure 200 with the receptacle, disengaging the moveable protection plate 206 in the raised position (as shown in FIG. 3A) from the housing 202.

For purposes of this description, certain aspects, advantages, and novel features of the embodiments of this disclosure are described herein. The disclosed processes, and systems should not be construed as being limiting in any way. Instead, the present disclosure is directed toward all novel and nonobvious features and aspects of the various disclosed embodiments, alone and in various combinations and sub-combinations with one another. The processes, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed processes can be used in conjunction with other processes. Additionally, the description sometimes uses terms like "provide" or "achieve" to describe the disclosed processes. These terms are high-level abstractions of the actual operations that are performed. The actual operations that correspond to these terms can vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A connector structure comprising:

a housing including a plurality of side walls, the plurality of side walls including a first side wall and a second side wall opposite the first side wall, and a first guide and a second guide that are attached to inner surfaces of the first side wall and the second side wall, respectively, the first guide including a first set of tracks and the second guide including a second set of tracks;

at least one pin located within the housing, wherein the plurality of side walls surround the at least one pin; and a moveable protection plate located within the housing, moveably connected to the housing, including at least one opening through which the at least one pin extends therethrough, including a first lateral portion captured in the first set of tracks and a second lateral portion captured in the second set of tracks such that the moveable protection plate translates within the housing along the first set of tracks and the second set of tracks between a raised position and a lowered position, and including a first retractable protrusion on the first lateral portion and a second retractable protrusion on the second lateral portion, the first retractable protrusion and the second retractable protrusion are biased outward and configured to extend through, respectively, a first upper opening in the first side wall and a second upper opening in the second side wall to lock the moveable protection plate in the raised position, and the first retractable protrusion and the second retractable protrusion are configured to be pressed inward from outside the housing to unlock the moveable protection plate from the raised position, wherein the moveable protection plate is configured to protect the at least one pin before the connector structure is connected with a receptacle, and the moveable protection plate is configured to be moved within the housing to allow the at least one pin to be exposed when the connector structure is mated with the receptacle.

2. The connector structure of claim 1, wherein the at least one pin includes an array of pins.

3. The connector structure of claim 1, wherein the moveable protection plate is configured to be locked into the raised position by engagement of the first retractable protrusion with the first upper opening and engagement of the second retractable protrusion with the second upper opening.

4. The connector structure of claim 3, wherein the moveable protection plate is configured to be locked into the lowered position within the housing by engagement of the first retractable protrusion with a first lower opening in the first side wall and engagement of the second retractable protrusion with a second lower opening in the second side wall to expose the at least one pin when the connector structure is mated with the receptacle.

5. The connector structure of claim 4, wherein the moveable protection plate is configured to be unlocked from the lowered position and returned to the raised position when the connector structure is unmated from the receptacle.

6. The connector structure of claim 1, wherein the first set of tracks and the second set of tracks extend perpendicular to the moveable protection plate.

7. The connector structure of claim 1, wherein the moveable protection plate is configured to slide within the housing along the first set of tracks and the second set of tracks against a spring bias in response to displacement of the moveable protection plate by the receptacle being connected with the connector structure.

8. A connector structure comprising:

a housing including a plurality of side walls, the plurality of side walls including a first side wall and a second side wall opposite the first side wall, the first side wall including a first guide having a first set of tracks and the second side wall including a second guide having a second set of tracks;

at least one pin located within the housing, wherein the plurality of side walls surround the at least one pin;

a moveable protection plate located within the housing, moveably connected to the housing, and including at least one opening through which each of the at least one pin extends therethrough, the moveable protection plate configured to translate within the housing along the first set of tracks and the second set of tracks between a raised position and a lowered position, the moveable protection plate including a first lateral portion captured in the first set of tracks and a second lateral portion captured in the second set of tracks; and at least one spring located within the housing and in direct contact with an underside of the moveable protection plate, wherein the moveable protection plate is configured to protect the at least one pin before the connector structure is connected with a receptacle, the at least one spring is configured to bias the moveable protection plate to a position to protect the at least one pin, and the moveable protection plate is configured to be moved within the housing to allow the at least one pin to be exposed when the connector structure is mated with the receptacle.

9. The connector structure of claim 8, wherein the at least one pin includes an array of pins.

10. The connector structure of claim 8, wherein the moveable protection plate is configured to be locked into the raised position within the housing to protect the at least one pin.

11. The connector structure of claim 8, wherein the moveable protection plate is configured to be locked into the lowered position within the housing to expose the at least one pin when the connector structure is mated with the receptacle.

12. The connector structure of claim 8, wherein the moveable protection plate is configured to be unlocked from the lowered position and returned to the raised position when the connector structure is unmated from the receptacle.

13. The connector structure of claim 8, wherein the first set of tracks and the second set of tracks extend perpendicular to the moveable protection plate.

14. The connector structure of claim 8, wherein the at least one spring is located between the moveable protection plate and a bottom portion of the housing.

15. A method of using a connector structure, the method comprising:

providing the connector structure comprising:

a housing including a plurality of side walls, the plurality of side walls including a first side wall and a second side wall opposite the first side wall, and a first guide and a second guide that are attached to inner surfaces of the first side wall and the second side wall, respectively, the first guide including a first set of tracks and the second guide including a second set of tracks;

at least one pin located within the housing, wherein the plurality of side walls surround the at least one pin; and a moveable protection plate located within the housing, moveably connected to the housing, including at least one opening through which the at least one pin extends therethrough, including a first lateral portion captured in the first set of tracks and a second lateral portion captured in the second set of tracks such that the moveable protection plate translates within the housing along the first set of tracks and the second set of tracks between a raised position and a lowered position, and including a first retractable protrusion on the first lateral portion and a second retractable protrusion on the second lateral portion, the first retractable protrusion and the second retractable protrusion are biased outward and configured to extend through, respectively, a first upper opening in the first side wall and a second upper opening in the second side wall to lock the moveable protection plate in the raised position, and the first retractable protrusion and the second retractable protrusion are configured to be pressed inward from outside the housing to unlock the moveable protection plate from the raised position; and connecting the connector structure with a receptacle, wherein the moveable protection plate is configured to be moved within the housing to the lowered position to allow the at least one pin to be exposed when the connector structure is connected with the receptacle.

16. The method of claim 15, wherein the moveable protection plate is configured to protect the at least one pin before the connector structure is connected with the receptacle.

17. The method of claim 15, further comprising:

after connecting the connector structure with the receptacle, disconnecting the connector structure from the receptacle and returning the moveable protection plate to the raised position.

18. The method of claim 15, further comprising:

locking the moveable protection plate in the raised position.

19. The method of claim 15, further comprising:

locking the moveable protection plate in the lowered position.

20. The method of claim 15, further comprising:

prior to connecting the connector structure with the receptacle, disengaging the moveable protection plate in the raised position from the housing.

* * * * *